United States Patent [19]
Eisen et al.

[11] Patent Number: 5,897,654
[45] Date of Patent: Apr. 27, 1999

[54] METHOD AND SYSTEM FOR EFFICIENTLY FETCHING FROM CACHE DURING A CACHE FILL OPERATION

[75] Inventors: Lee E. Eisen; Belliappa M. Kuttanna; Soummya Mallick; Rajesh B. Patel, all of Austin, Tex.

[73] Assignees: International Business Machines Corporation, Armonk, N.Y.; Motorola, Inc., Schaumburg, Ill.

[21] Appl. No.: 08/881,223

[22] Filed: Jun. 24, 1997

Related U.S. Application Data

[63] Continuation of application No. 08/386,976, Feb. 10, 1995, abandoned.

[51] Int. Cl.[6] .................................................. G06F 13/00
[52] U.S. Cl. ...................... 711/131; 711/149; 711/133; 711/168
[58] Field of Search .................................... 395/458, 460, 395/477, 478, 481, 495, 853; 711/149, 131, 133, 150, 151, 168

[56] References Cited

U.S. PATENT DOCUMENTS

| | | |
|---|---|---|
| 4,860,192 | 8/1989 | Sachs et al. . |
| 4,899,275 | 2/1990 | Sachs et al. . |
| 5,027,270 | 6/1991 | Riordan et al. . |
| 5,179,680 | 1/1993 | Colwell et al. . |
| 5,291,442 | 3/1994 | Emma et al. ........................ 711/120 |
| 5,353,426 | 10/1994 | Patel et al. . |
| 5,361,391 | 11/1994 | Westberg .............................. 711/137 |
| 5,367,660 | 11/1994 | Gat et al. ................................. 711/3 |
| 5,386,526 | 1/1995 | Mitra et al. ............................... 711/3 |
| 5,414,824 | 5/1995 | Grochowski ............................. 711/3 |
| 5,440,707 | 8/1995 | Hayes et al. .............................. 711/3 |
| 5,511,175 | 4/1996 | Favor et al. ........................... 395/392 |
| 5,522,057 | 5/1996 | Lichy ..................................... 711/144 |
| 5,561,781 | 10/1996 | Braceras et al. ...................... 711/131 |
| 5,594,876 | 1/1997 | Getzlaff et al. ....................... 395/293 |
| 5,603,004 | 2/1997 | Kurpanek et al. .................... 711/118 |
| 5,651,135 | 7/1997 | Hatakeyama .......................... 711/128 |
| 5,664,147 | 9/1997 | Mayfield .............................. 711/137 |

OTHER PUBLICATIONS

PowerPC 601 RISC Microprocessor User's Manual, 1993 IBM Microelectronics publications.
IBM Technical Disclosure Bulletin, vol. 27, No. 5, Oct. 1984, "Prefetching Pacing Buffer to Reduce Cache Misses".

*Primary Examiner*—William M. Treat
*Assistant Examiner*—Zarni Maung
*Attorney, Agent, or Firm*—Casimer K. Salys; Brian F. Russell; Andrew J. Dillon

[57] ABSTRACT

A method and system in a data processing system for efficiently interfacing with cache memory by allowing a fetcher to read from cache memory while a plurality of data words or instructions are being loaded into the cache. A request is made by a bus interface unit to load a plurality of instructions or data words into a cache. In response to each individual instruction or data word being loaded into the cache by the bus interface unit, there is an indication that the individual one of said plurality of instructions or data words is valid. Once a desired instruction or data word has an indication that it is valid, the fetcher is allowed to complete a fetch operation prior to all of the instructions or data words being loaded into cache. In one embodiment, a group of invalid tag bits may be utilized to indicate to the fetcher that individual ones of a group of instructions or data words are valid in cache after being written into cache by the bus interface unit.

12 Claims, 8 Drawing Sheets

METHOD AND SYSTEM FOR EFFICIENTLY FETCHING FROM CACHE DURING A CACHE FILL OPERATION

This is a continuation of application Ser. No. 08/386,976, filed Feb. 10, 1995 now abandoned.

BACKGROUND OF THE INVENTION

1. Technical Field

The present invention relates in general to an improved data processing system, and in particular to an improved method and system for cache memory management. Still more particularly, the present invention relates to a method and system to reduce fetching delays caused by the inaccessibility of cache during block transfers to cache memory.

2. Description of the Related Art

A pipelined processor is one in which the processing of an instruction is divided into discreet stages. Because the processing of an instruction is broken into a series of stages, an instruction does not require the entire resources of an execution unit which executes the instruction. For example, after an instruction completes a decode stage, it can pass onto the next stage, while the subsequent instruction can advance into the decode stage. Pipelining improves the throughput of the instruction flow. For example, it may take three cycles for a floating-point instruction to complete, but if there are no stalls in the floating-point pipeline, a series of floating-point instructions can have a throughput of one instruction per cycle.

A superscalar processor is one that issues multiple independent instructions into multiple pipelines allowing instructions to execute in parallel. Typical execution units may include: an integer unit (IU), a floating-point unit (FPU), a branch processing unit (BPU), a load/store unit (LSU), and a system register unit (SRU). FIG. 1 is an example of an embodiment of a superscalar data processing system. The embodiment of the superscalar data processing system shown in FIG. 1 is similar to that sold by International Business Machines Corporation under the trademark "PowerPC."

In FIG. 1, superscalar data processing system 100 includes five independent execution units and two register files. The five independent execution units include: branch processing unit 102, load/store unit 104, integer unit 106, and floating-point unit 108. Register files include: General purpose register file (GPR) 107 for integer operands, and Floating-point register file (FPR) 109 for single- or double-precision operands.

As shown in FIG. 1, instruction unit 110 contains sequential fetcher 112, instruction queue 114, dispatch unit 116, and branch processing unit 102. Instruction unit 110 provides centralized control of instruction flow to the execution units. Instruction unit 110 determines the address of the next instruction to be fetched based on information from the sequential fetcher 112 and branch processing unit 102.

Sequential fetcher 112 fetches instructions from instruction cache 118 and loads such instructions into instruction queue 114. Branch instructions are identified by sequential fetcher 112, and forwarded to branch processing unit 102 directly, bypassing instruction queue 114. Such a branch instruction is either executed and resolved (if the branch is unconditional or if required conditions are available), or is predicted. Non-branch instructions are issued from instruction queue 114, with the dispatch rate being contingent on execution unit busy status, rename and completion buffer availability, and the serializing behavior of some instructions. Instruction dispatch is done in program order. BPU 102 uses static branch prediction on unresolved conditional branches to allow instruction unit 110 to fetch instructions from a predicted target instruction stream while a conditional branch is evaluated. Branch processing unit 102 folds out branch instructions for unconditional branches or conditional branches unaffected by instructions in progress in the execution pipeline.

Instruction queue 114 holds several instructions loaded by sequential fetcher 112. Sequential fetcher 112 continuously loads instructions to keep the space in instruction queue 114 filled. Instructions are dispatched to their respective execution units from dispatch unit 116.

In operation, instructions are fetched from instruction cache 118 at a peak rate of two per cycle, and placed in either instruction queue 114 or branch processing unit 102. Instructions entering instruction queue 114 are issued to the various execution units from instruction queue 114. Instruction queue 114 is the backbone of the master pipeline for superscalar data processing system 100, and may contain, for example, a six-entry queue. If while filling instruction queue 114, a request from sequential fetcher 112 misses in instruction cache 118, then arbitration for a memory access will begin.

The timing of the instruction fetch mechanism in superscalar data processing system 100 depends heavily on the state of on-chip instruction cache 118. The speed with which the required instruction is returned to sequential fetcher 112 depends on whether or not the instruction being asked for is in the on-chip instruction cache 118 (a cache hit) or whether a memory transaction is required to bring the data into instruction cache 118 (a cache miss).

CACHE ARBITRATION

When sequential fetcher 112 attempts to fetch instructions from instruction cache 118, instruction cache 118 may or may not be able to respond to the request. There are two scenarios in the prior art that may be encountered by sequential fetcher 112 when it requests instructions from instruction cache 118.

The first scenario is when the instruction cache 118 is idle and a request comes in from sequential fetcher 112 for additional instructions. In this case, instruction cache 118 responds with the requested instructions on the next clock cycle.

The second scenario occurs if at the time sequential fetcher 112 requests instructions, instruction cache 118 is busy due to a cache line reload operation. In the prior art, when this case arises, instruction cache 118 will be inaccessible until the reload operation is complete.

Such instruction cache reload operations—which may also be referred to as block transfers, burst data transfers, and a burst fill—are performed by bus interface unit 120. Typically, instruction cache reload operations are performed in a four-beat burst data transfer which loads eight instructions (four double words) into instruction cache 118. BIU 120 controls access to the external address and data buses by participating in bus arbitration. The external address bus is shown at reference numeral 122, and the external data bus is shown at reference numeral 124.

Also shown in superscalar data processing system 100 are data cache 126, instruction memory management unit 128, memory management unit 130 and completion unit 132. Data cache 126 provides cache memory for load/store unit 104. Instruction memory management unit 128 and data memory management unit 130 support accesses to virtual memory and physical memory for both instructions and data, respectively. The memory management units perform address translations and determine whether a cache hit or miss has occurred.

With reference now to FIG. 2A, there is depicted a timing diagram which illustrates a cache miss followed by loading a series of sequential instructions from main memory. For all timing diagrams shown in the figures, clock cycles are numbered across the top of the timing diagram. Address and data signals are clearly labeled below the numbered clock cycles. The legend in each timing diagram may be used to distinguish the various stages of instruction execution. Such stages of instruction execution include: fetch, dispatch, execute, write back, and deallocate. Because superscalar data processing system 100 includes pipelining, several instructions are shown in various stages of execution during a single clock cycle.

As shown in FIG. 2A, branch instruction 200 causes an instruction cache miss during clock cycle 2. Such a cache miss then causes a memory access, where a starting address of a block of instructions is applied to the system bus, as shown in clock cycle 3. During clock cycle 4, two instructions (one beat) are returned from memory to BIU 120, and are forwarded to instruction cache 118 and sequential fetcher 112, as shown at clock cycles 5 and 6. In this example, subsequent non-branch instructions are also loaded into instruction cache 118 and forwarded to sequential fetcher 112 as those instructions become available from main memory. Because instructions are forwarded to sequential fetcher 112 as they become available, sequential fetcher 112 does not need to access instruction cache 118 to fetch the subsequent non-branch instructions.

On a cache miss, a block or line in instruction cache 118 is filled in four beats of 64 bits each. This "burst fill" is performed as a "critical-double-word-first" operation; the critical-double-word is simultaneously written to instruction cache 118 and forwarded to the requesting unit—such as sequential fetcher 112—thus minimizing stalls due to cache fill latency. In the prior art, instruction cache 118 cannot be accessed internally until the burst fill completes. Thus, forwarding subsequent non-branch instructions to sequential fetcher 112 prevents a fetching delay caused by instruction cache 118 being busy during a block fill.

With reference now to FIG. 2B, there is depicted a timing diagram that illustrates a cache miss followed by the execution of a branch instruction in the block of instructions loaded as a result of the cache miss. As illustrated in FIG. 2B, branch instruction 230 causes a cache miss. In response to such a cache miss, address information is placed on address bus 122 during cycle 3, and the first beat of instruction data returns from data bus 124 during cycle 4. This instruction data returned from the bus is forwarded to instruction cache 118 and sequential fetcher 112 immediately, as shown by the fetch stage of add instruction 232.

However, in this example, add instruction 232 is followed by branch instruction 234, which, in the prior art, causes subsequent instruction fetching to be suspended until the block instruction transfer initiated by branch 230 is completed. Thus, instructions following branch 234 are not fetched until the last beat of the block instruction transfer is completed as shown in cycle 10. Because sequential fetcher 112 is not allowed to access instruction cache 118 until the burst memory transaction has been completed, the fetching and execution of add instruction 236 is delayed, even though add instruction 236 may already be stored in instruction cache 118, or add instruction 238 may be loaded into the cache before completion of the block transfer that resulted because of branch 230.

Thus, it should be apparent that a need exists for a method and system to permit a sequential fetcher to fetch instructions from cache memory before the completion of a block transfer to cache, even if instruction flow branches from one instruction in the block being transferred to another instruction in the same block.

SUMMARY OF THE INVENTION

It is therefore one object of the present invention to provide an improved data processing system.

It is another object of the present invention to provide an improved method and system for cache memory management.

It is yet another object of the present invention to provide a method and system to reduce fetching delays caused by the inaccessibility of cache during block transfers to cache memory.

The foregoing objects are achieved as is now described. A method and system are disclosed in a data processing system for efficiently interfacing with cache memory by allowing a fetcher to read from cache memory while a plurality of data words or instructions are being loaded into the cache. A request is made by a bus interface unit to load a plurality of instructions or data words into a cache. In response to each individual instruction or data word being loaded into the cache by the bus interface unit, there is an indication that the individual one of said plurality of instructions or data words is valid. Once a desired instruction or data word has an indication that it is valid, the fetcher is allowed to complete a fetch operation prior to all of the instructions or data words being loaded into cache. In one embodiment, a group of invalid tag bits may be utilized to indicate to the fetcher that individual ones of a group of instructions or data words are valid in cache after being written into cache by the bus interface unit.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
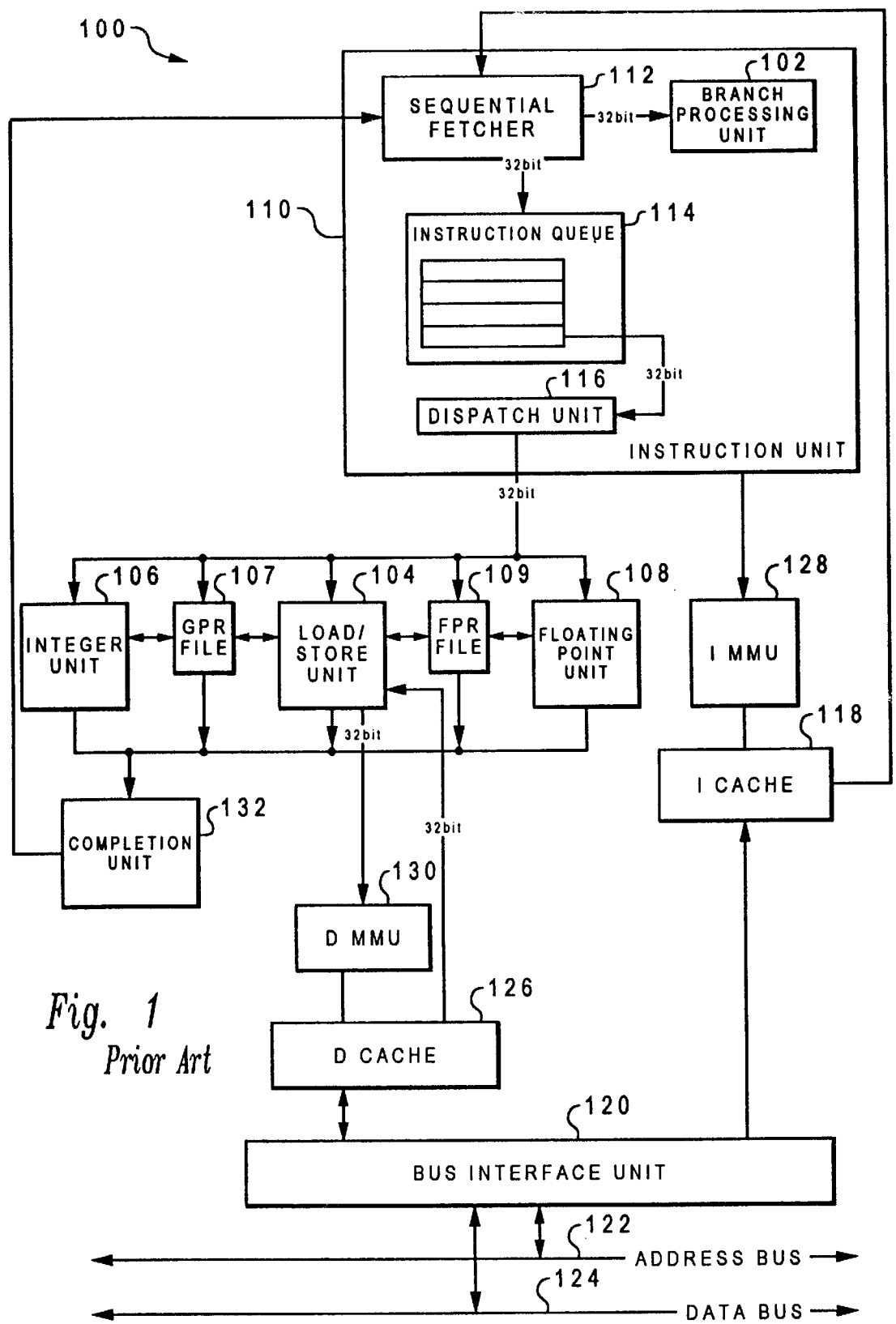
FIG. 1 is an example of a prior art embodiment of a superscalar data processing system.
Figure 3:
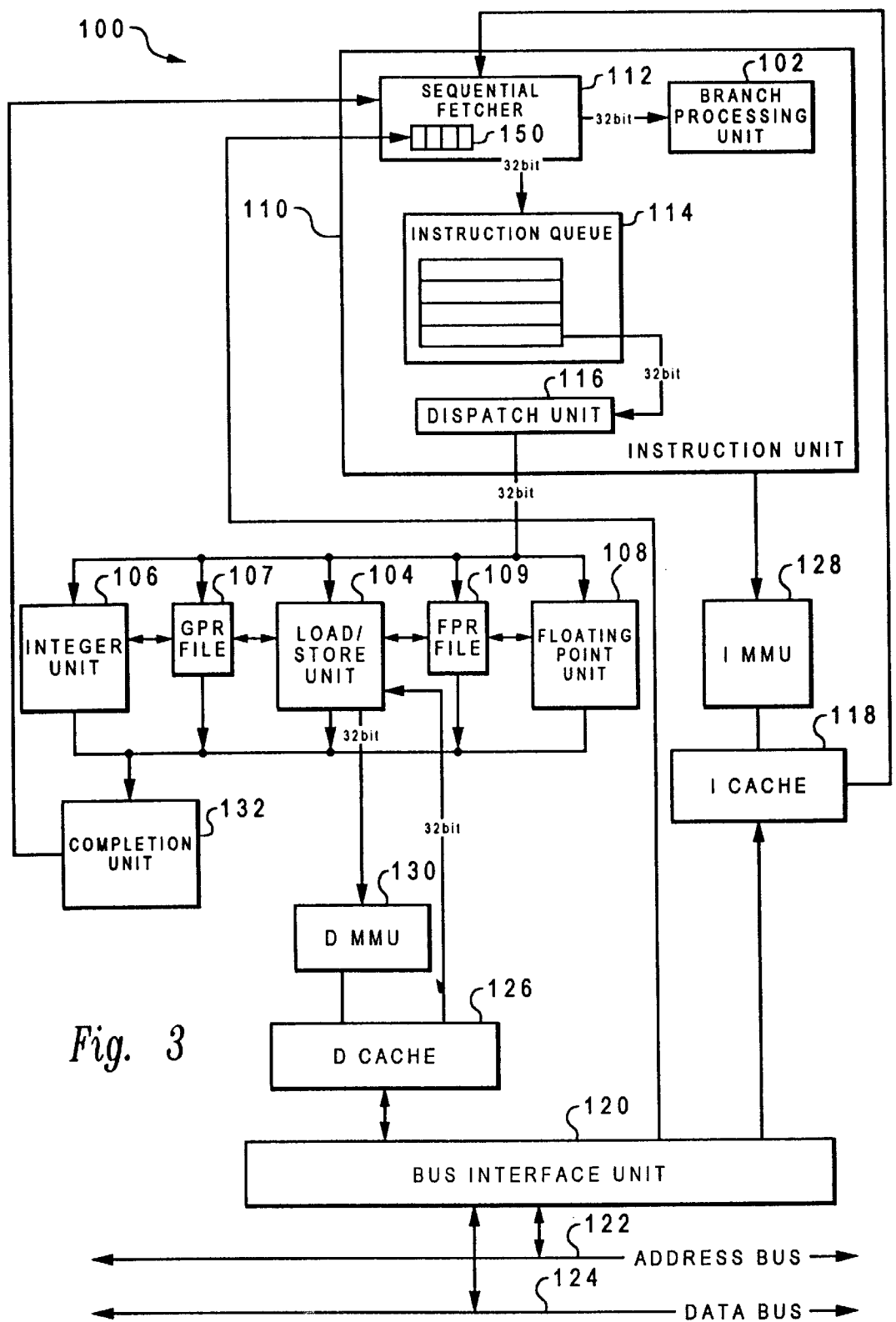
FIG. 3 depicts a superscalar data processing system in accordance with the method and system of the present invention.

With reference now to the figures and in particular with reference to FIG. 3, there is depicted a superscalar data processing system in accordance with the method and system of the present invention. As illustrated, superscalar data processing system 100 includes five independent execution units and two register files. These execution units and register files are the same as those depicted in FIG. 1. However, in accordance with an important aspect of the present invention, sequential fetcher 112 is able to read invalid tag bits 150 which are set and cleared in response to bus interface unit 120 loading beats of instruction data into instruction cache 118. As described below in greater detail, individual bits in invalid tag bits 150 are set appropriately as bus interface unit 120 loads a corresponding beat into a line in instruction cache 118. Each of these bits in invalid tag bits 150 indicates to sequential fetcher 112 that a corresponding one of multiple beats being loaded into instruction cache 118 is available for fetching and transferring to either branch processing unit 104 or instruction queue 114.

In the prior art, sequential fetcher 112 was stalled (i.e., not allowed to fetch additional instructions from instruction cache 118) while instruction cache 118 was being loaded by bus interface unit 120 in a block transfer mode. Thus, if a branch instruction occurred as one of the instructions in the block transfer into instruction cache 118, and such a branch instruction transferred execution to another valid line in instruction cache 118, sequential fetcher 112 was forced to wait while the block transfer completed before sequential fetcher 112 was allowed to fetch a new instruction in the other valid cache line.

According to the present method and system, sequential fetcher 112 is permitted to fetch instructions in other valid cache locations, and in a currently loading cache line, as those instructions are needed and as they become available as indicated by invalid tag bits 150. For example, invalid tag bits 150 may be set to b'0000' before a block transfer begins. As bus interface unit 120 loads the first beat into instruction cache 118, invalid tag bits may be set to b'1000' to indicate the first beat of instructions has been loaded and is available to sequential fetcher 112. The other three bits of invalid tag bits 150 are set as the remaining three beats of the block transfer are completed.

Figure 4A:
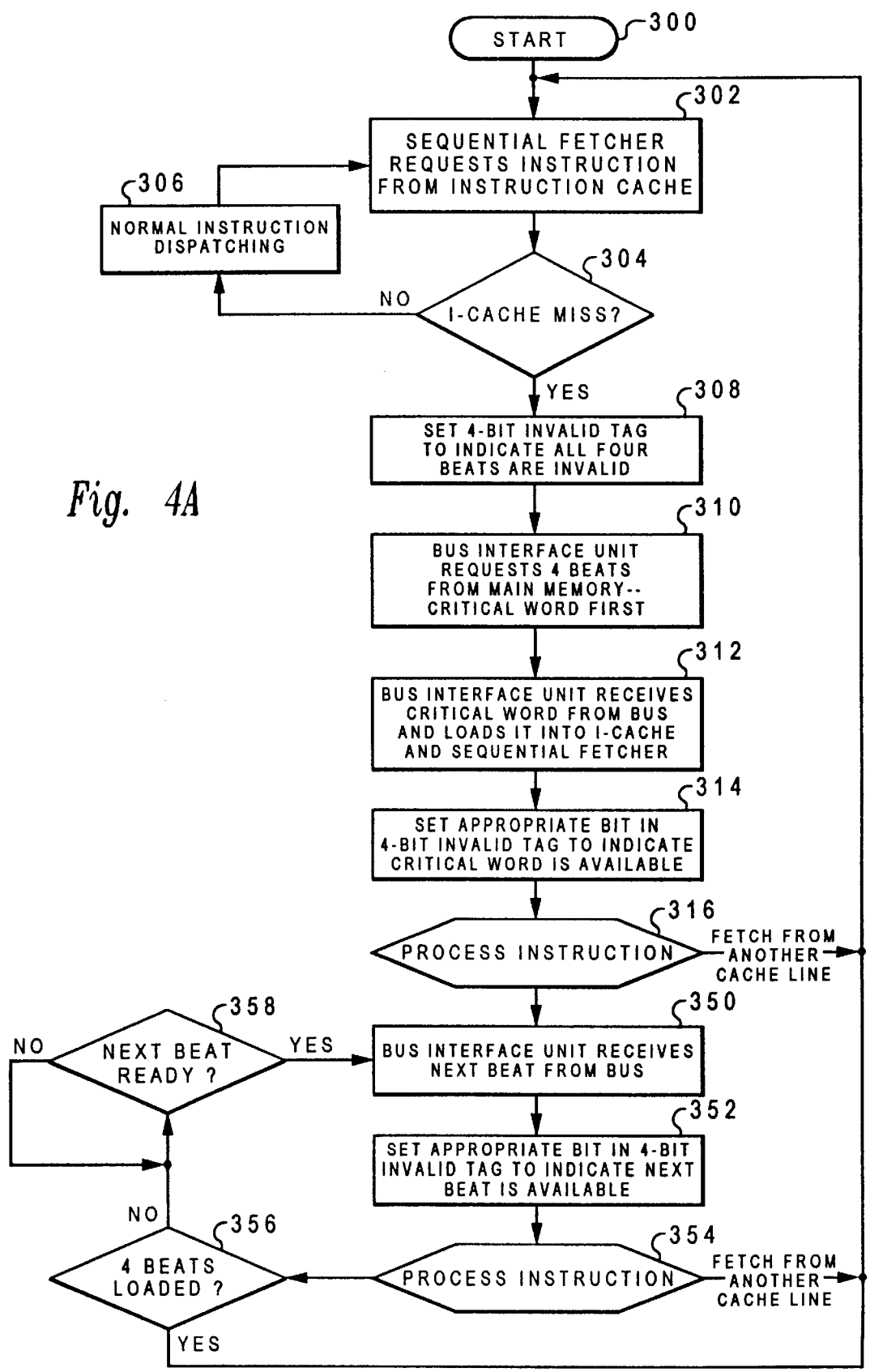
FIG. 4A is a flowchart which illustrates the process of fetching instructions from memory in accordance with the method and system of the present invention.

With reference now to FIG. 4A, there is depicted a flowchart which illustrates the process of fetching instructions from memory in accordance with the method and system of the present invention. As illustrated, the process begins at block 300, and thereafter passes to block 302, where the sequential fetcher requests the next instruction from instruction cache. The process then determines whether or not the requested instruction is stored in the instruction cache, as illustrated at decision block 304. If the instruction is located in instruction cache, there will not be an instruction cache miss, and normal instruction dispatching from instruction cache will proceed, as depicted at block 306.

In normal instruction dispatching, the sequential fetcher fetches instructions from cache and sends non-branch instructions to the instruction queue, and sends branch instructions to the branch processing unit. In normal instruction dispatching, the sequential fetcher is able to fetch instructions from the instruction cache during each clock cycle provided that the instruction is stored in the instruction cache and the instruction queue is able to accept new instructions. Once the instructions are dispatched as shown at block 306, the sequential fetcher once again requests an instruction from instruction cache, as depicted at block 302.

If, at block 304, there is an instruction cache miss, the process sets all bits in an invalid tag to indicate that instructions contained in all memory locations in a line of cache where the miss occurred are invalid, as illustrated at block 308. In one embodiment, such an invalid tag contains four bits which correspond to four beats which are requested in response to such a cache miss. In the embodiment described here, a cache line contains four beats, or eight instructions. Those persons skilled in the art should recognize that the invalid tag may be capable of indicating the validity of various numbers of storage locations in a line of cache, and that such an invalid tag size may be selected according to the number of beats or words stored in a cache line.

Next, the bus interface unit requests four beats from main memory, with the critical word requested first, as illustrated at block 310. As a result of such a bus interface unit request, four beats (eight instructions) will be received from main memory in a four-beat burst data transfer. The "critical word" is the word that caused the cache miss, as determined at block 304.

Next, the bus interface unit receives the critical word from the data bus and simultaneously loads it into instruction cache and the sequential fetcher, as depicted at block 312. To minimize stalls due to cache fill latency, the critical word is simultaneously written to the instruction cache and forwarded to the sequential fetcher, which is the requesting unit.

Next, the process sets the appropriate bit in the four-bit invalid tag to indicate to the sequential fetcher that the critical word is available, as illustrated at block 314. Once the appropriate bit in the four-bit invalid tag has been set, the sequential fetcher is notified that new instructions are ready to be sent to the instruction queue or the branch processing unit.

Figure 4B:
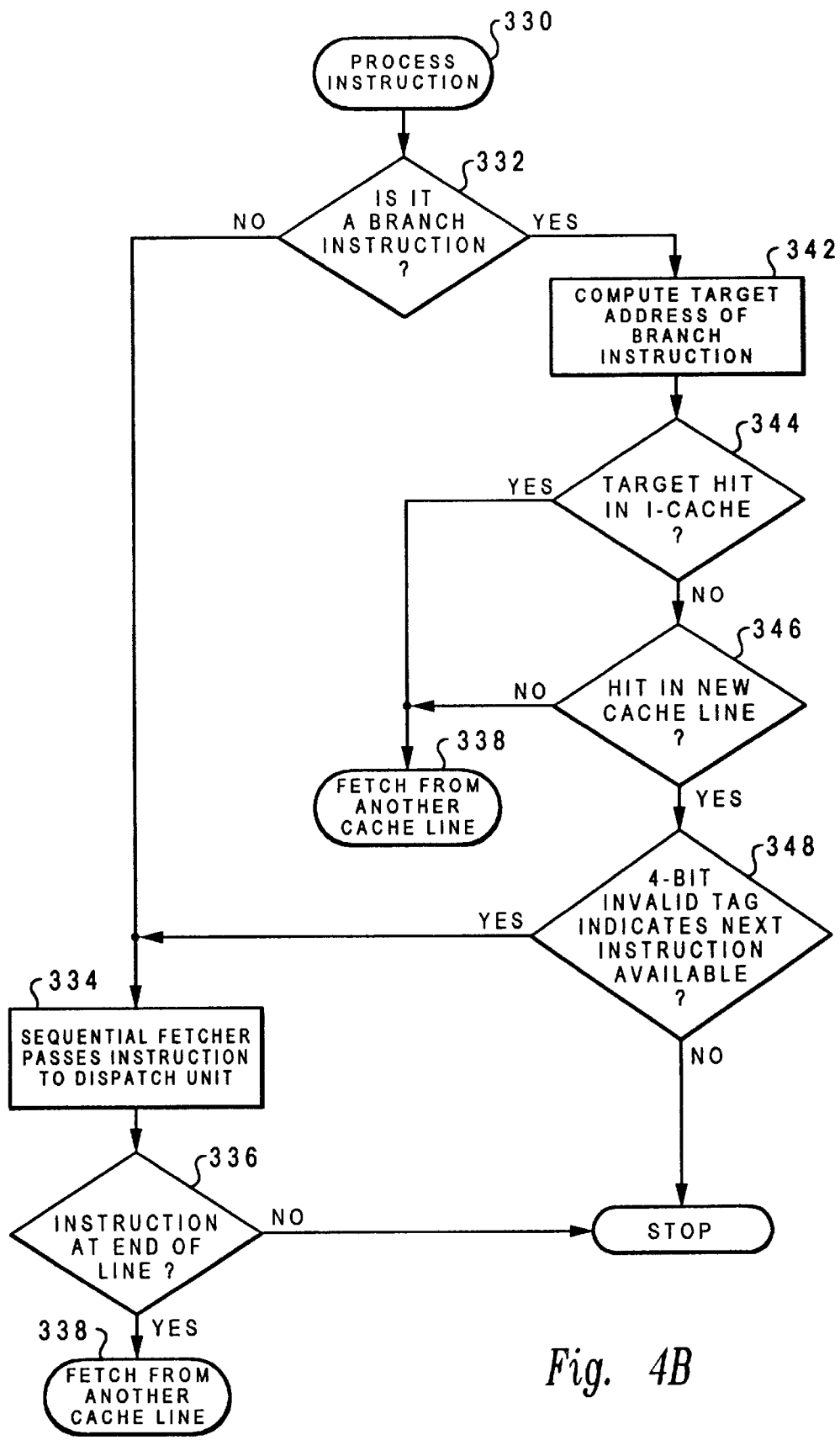
FIG. 4B is a flowchart which illustrates the process of dispatching non-branch instructions and processing branch instructions that are located in a cache line that is in the process of being filled in response to a cache miss.

Next, as depicted by block 316, process flow is passed to an instruction processing routine which is illustrated in FIG. 4B. The "process instruction" subroutine has one entry point, as indicated by the arrow entering block 316, and two exit points, as indicated by the two arrows pointing away from block 316.

With reference now to FIG. 4B, there is depicted a process of dispatching non-branch instructions and processing branch instructions that are located in a cache line that is in the process of being filled due to a cache miss that occurred in FIG. 4A. As illustrated, the "process instruction" subroutine begins at block 330 and thereafter passes to block 332, where the process determines whether or not the instruction loaded from the BIU is a branch instruction.

If the instruction is not a branch instruction, the sequential fetcher passes the instruction to the dispatch unit via the instruction queue, as illustrated at block 334. After the non-branch instruction has been sent to the dispatch unit, the process determines whether or not the dispatched non-branch instruction was at the end of a cache line, or block, as depicted at block 336. The branch taken as a result of this decision determines whether the process will wait for additional beats, or instructions, to be received from main memory, or whether the process will attempt to fetch instructions from another location in instruction cache that is not currently being filled with the block transfer. If the instruction dispatched at block 334 is at the end of a cache line, the process exits the "process instruction" subroutine as illustrated at terminal block 338, and begins to request an instruction from a location within the instruction cache which is not currently being filled with a block transfer, as illustrated at block 302 in FIG. 4A.

If, however, the instruction dispatched at block 334 is not at the end of a cache line, the process exits the "process instruction" subroutine at terminal block 340, and continues with the next instruction following the "process instruction" subroutine call in FIG. 4A. If this NO branch is taken from block 336, the process will wait for additional instructions to be received from the bus interface unit.

Referring again to block 332, if the instruction received from the bus interface unit is a branch instruction, the process computes the target address of the branch instruction, as depicted at block 342. Thereafter, the process determines whether or not the computed target "hits" in instruction cache, as depicted at block 344. If the computed target "hits" in instruction cache, the target of the branch instruction has already been stored in instruction cache, and the process exits the "process instruction" subroutine as illustrated at terminal block 338, and continues processing at block 302 in FIG. 4A. Thus, according to an important aspect of the present invention, the sequential fetcher may continue to fetch instructions starting at the target of the branch instruction while the remaining portion of the cache line is filled by the block transfer from the bus interface unit. According to the present invention, the fetcher is allowed to fetch instructions from a second valid cache line while a first cache line completes a block fill.

Referring again to block 344, if the target address of the branch instruction does not "hit" in instruction cache, the process determines whether or not the target address "hits" in the new cache line which is currently being block transferred from the bus interface unit, as illustrated at block 346. If the target address does not hit in the new cache line being loaded from the bus interface unit, the process exits the "process instruction" subroutine as illustrated at terminal block 338, and continues processing at block 302 in FIG. 4A, where the sequential fetcher requests an instruction from instruction cache, and causes a cache "miss" at block 304 of FIG. 4A.

If, however, the computed target hits in the cache line currently being filled by the bus interface unit, the process then determines whether or not the four-bit invalid tag indicates that the next instruction, or the computed target address, is available in the instruction cache, as illustrated at block 348. If the four-bit invalid tag indicates that the next instruction is available, the sequential fetcher passes the instruction to the dispatch unit via the instruction queue, as depicted at block 334. Following this dispatch of the instruction illustrated at block 334, the process determines whether there is a need to wait for additional instructions to be loaded which belong to the presently loading cache loading cache line, or whether the end of the cache line has been reached and the process may continue fetching from another cache line, as illustrated at block 336. At this point, the process determines which exit to take from the "process instruction" subroutine as discussed above.

Referring again to block 348, if the four-bit invalid tag indicates that the next instruction is not available, the process exits the "process instruction" subroutine as depicted at terminal block 340 and continues processing at the block immediately after the subroutine call in FIG. 4A.

Referring again to FIG. 4A, the "process instruction" subroutine illustrated at block 316 determines whether to fetch the next instruction from another cache line that is not currently being loaded, as indicated by the branch from block 316 to block 302, or determines that additional instructions are needed from the bus interface unit which is currently loading a line in instruction cache, as illustrated by the branch from block 316 to block 350.

If the process proceeds to block 350, the bus interface unit receives the next beat in the block transfer from the data bus. After the beat has been received, the process sets the appropriate bit in the four-bit invalid tag to indicate to the sequential fetcher that the next beat is available, as illustrated at block 352. Thereafter, the process calls the "process instruction" subroutine to determine how the instruction will be handled by the sequential fetcher as discussed above with reference to FIG. 4B. This subroutine call is depicted at block 354.

In the execution of the "process instruction" subroutine, the process determines whether to allow the fetcher to continue fetching from other cache lines in the instruction cache, or whether to wait for additional instructions to be received from the bus interface unit during the block fill operation on the current cache line. If the "process instruction" subroutine determines that the sequential fetcher will attempt to fetch an instruction from another line in the instruction cache, the process passes from block 354 to block 302 to continue instruction fetching from another cache line. If, however, the process determines that the next instruction should be fetched from the cache line that is currently being filled, the process passes from block 354 to block 356.

As illustrated at block 356, the process determines whether or not all four beats have been received from the bus interface unit and loaded into instruction cache. If all four beats have been loaded, the process continues at block 302, as illustrated by the YES branch from block 356. If all four beats have not been loaded, the process passes to block 358, where the process waits for the next beat to be loaded into instruction cache and forwarded to the sequential fetcher.

Figure 5:
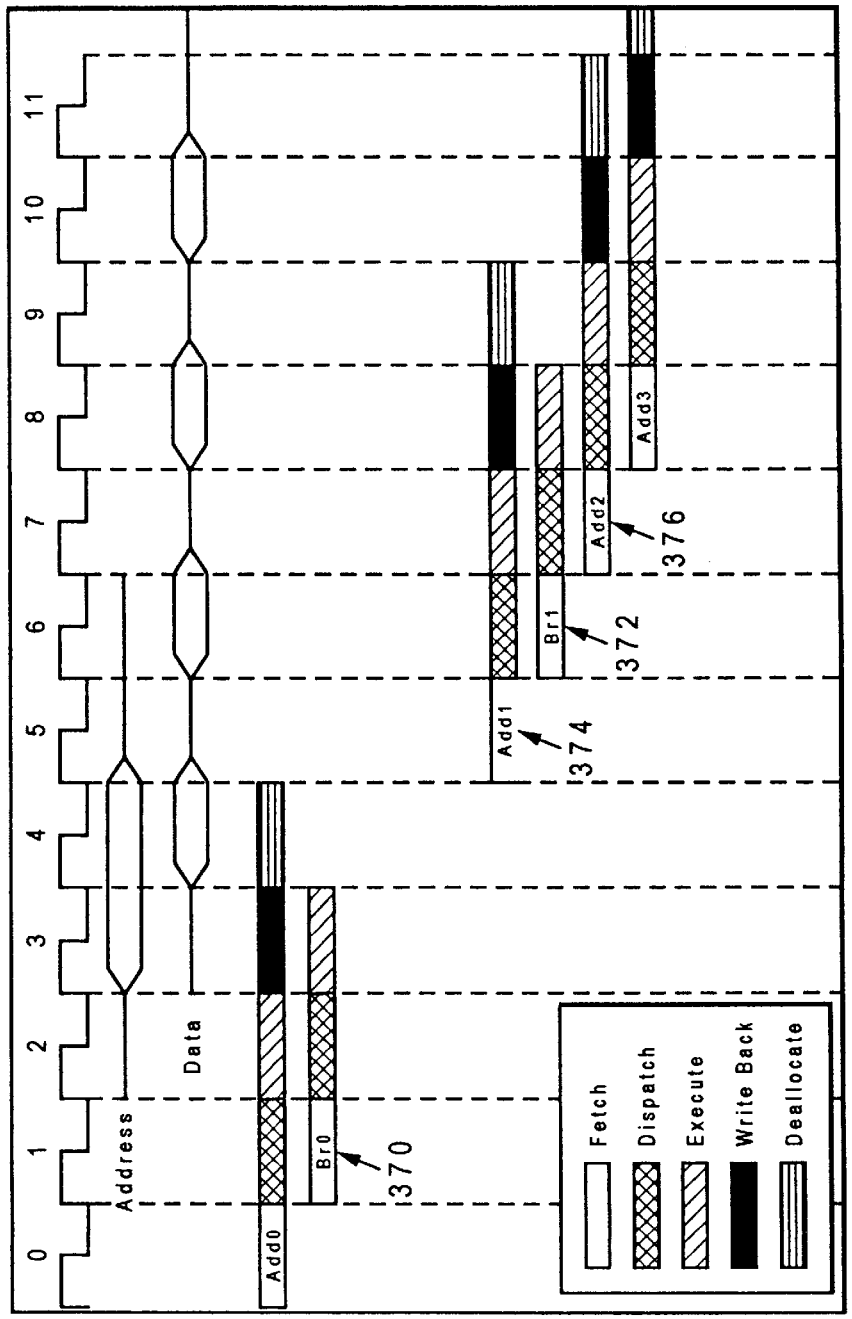
FIG. 5 is a timing diagram which illustrates a cache miss followed by the execution of a branch instruction in the block of instructions loaded as a result of a cache miss in accordance with the method and system of the present invention.

Referring now to FIG. 5, there is depicted a timing diagram which illustrates a cache miss followed by the execution of a branch instruction in the block of instructions loaded as a result of the cache miss in accordance with the method and system of the present invention. As illustrated, branch instruction 370 causes a cache miss. In response to this cache miss, address information is placed on address bus 122 during cycle 3, and the first beat of instructions data returns from data bus 124 during cycle 4. The first instruction in the first beat is fetched during cycle 5 and during cycle 6 the second instruction—branch instruction 372 is fetched. In the example depicted in FIG. 5, the target address of branch instruction 372 is in another cache line than the cache line which contains add instruction 374—which is the cache line that is currently being loaded in a block transfer. The instruction at the target location of branch instruction 372 is add instruction 376. Add instruction 376 is fetched during cycle 7 because in accordance with the present invention there is no need to delay fetching from another cache line that is not the cache line currently being loaded with a block transfer. In the prior art, fetching add instruction 376 would not occur until after cycle 10 when the currently loading cache line has been filled.

Figure 2A:
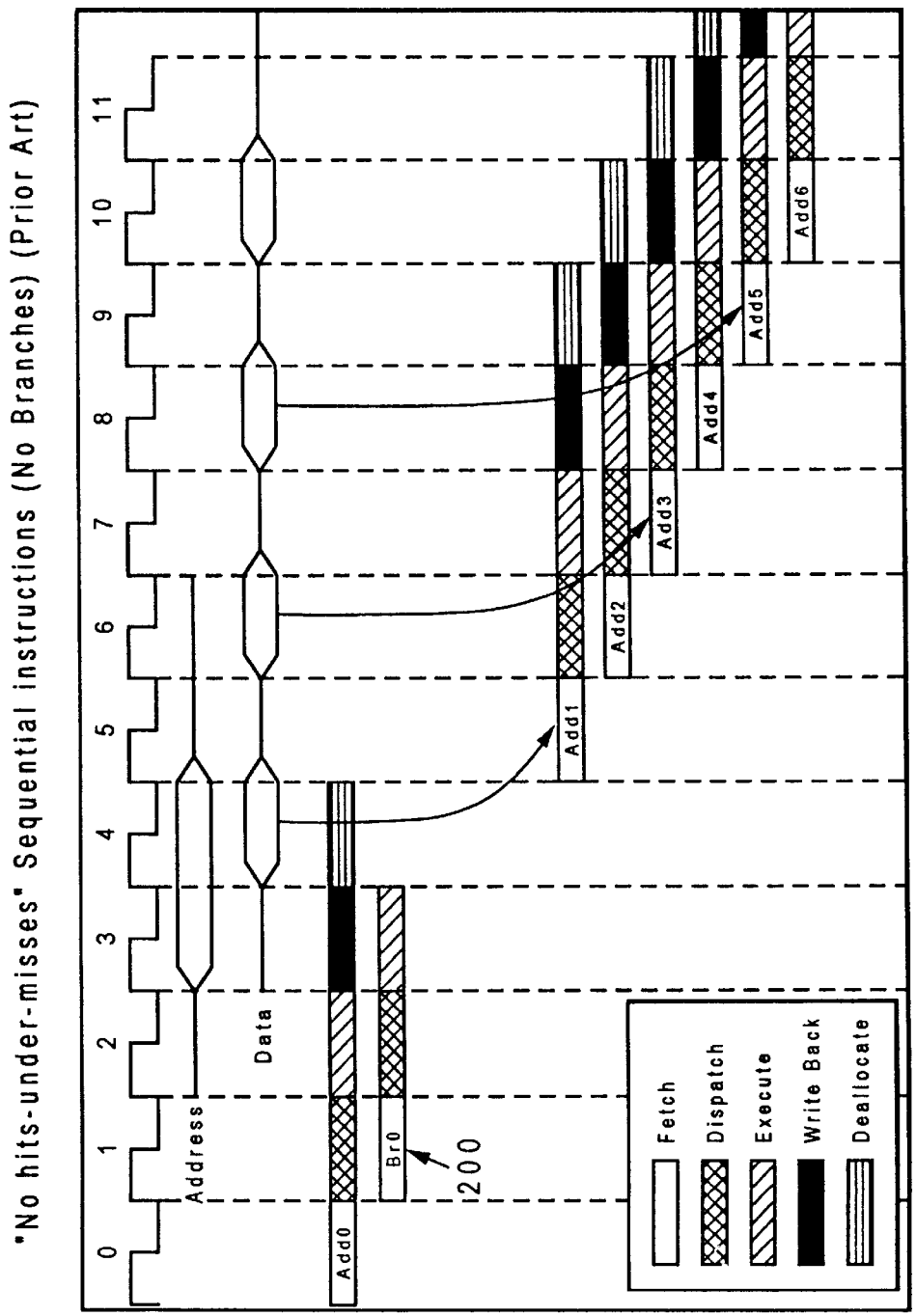
FIG. 2A is a prior art timing diagram which illustrates a cache miss followed by loading of a series of sequential instructions from main memory.
Figure 2B:
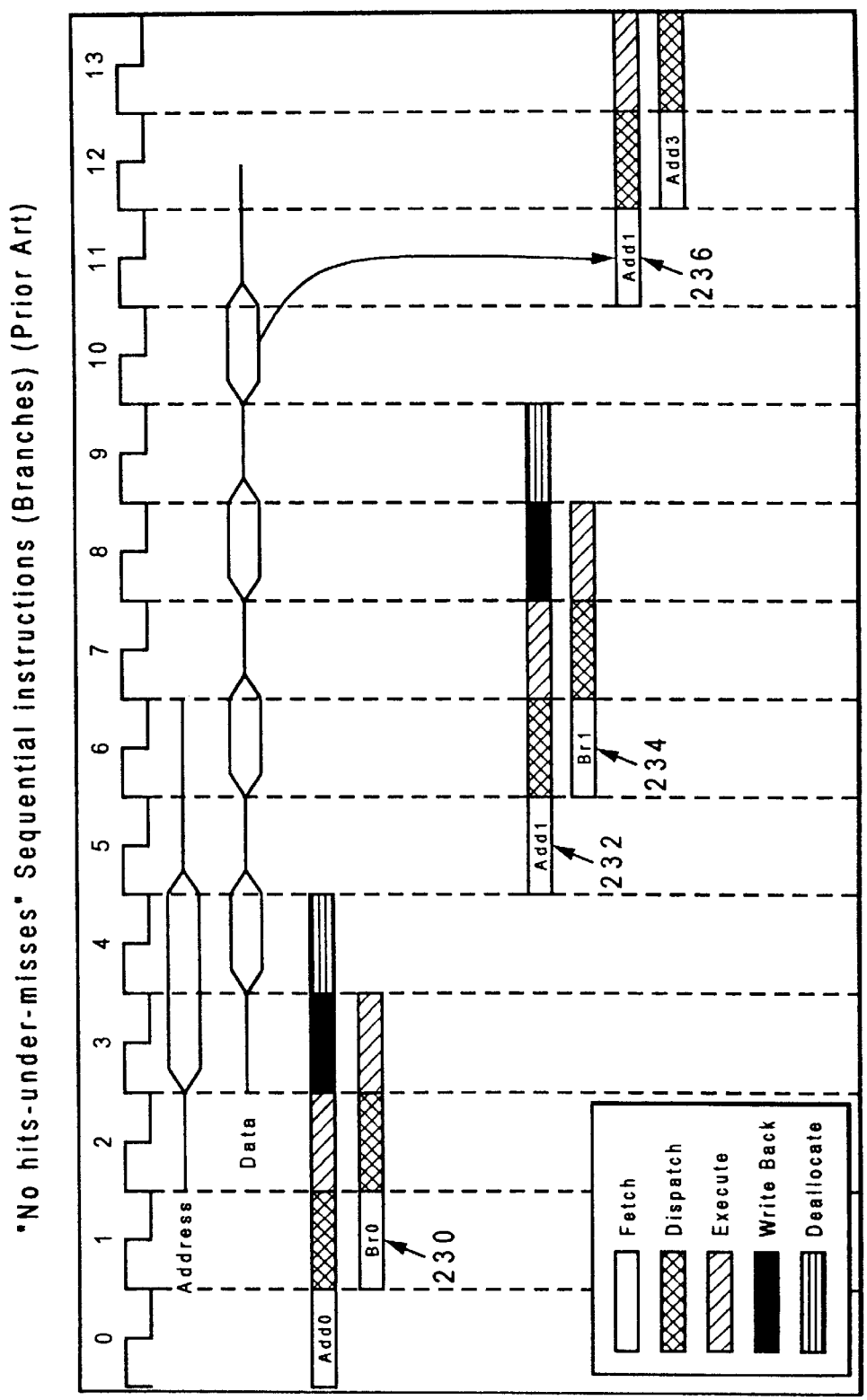
FIG. 2B is a prior art timing diagram that illustrates a cache miss followed by the execution of a branch instruction in a block of instructions loaded as a result of a cache miss.

The example shown in FIG. 5 is different from the example shown in FIG. 2A because FIG. 2A shows forwarding non branch instructions to sequential fetcher 112 as those non branch instructions are being loaded into instruction cache 118. In the example depicted in FIG. 5, branch instruction 372 causes program execution to jump to another cache line which may already be present in instruction cache 118.

Note that the timing diagrams described herein are utilized to illustrate a principle, and may not represent the actual timing of loading instructions into cache and fetching instructions from cache. For example, FIG. 5 shows data (beats) being loaded into instruction cache 118 at the rate of one beat during every other cycle, when in reality there may be several cycles between loading beats into instruction cache 118. Because the time between loading beats into instruction cache 118 has been compressed, some timing diagrams may depict what looks like a conflict between bus interface unit 120 loading instruction cache 118 and sequential fetcher 112 fetching instructions from instruction cache 118. Those persons skilled in the art of data processing system design should appreciate that if these timing diagrams were drawn more precisely, such memory contentions would not be depicted.

Figure 6:
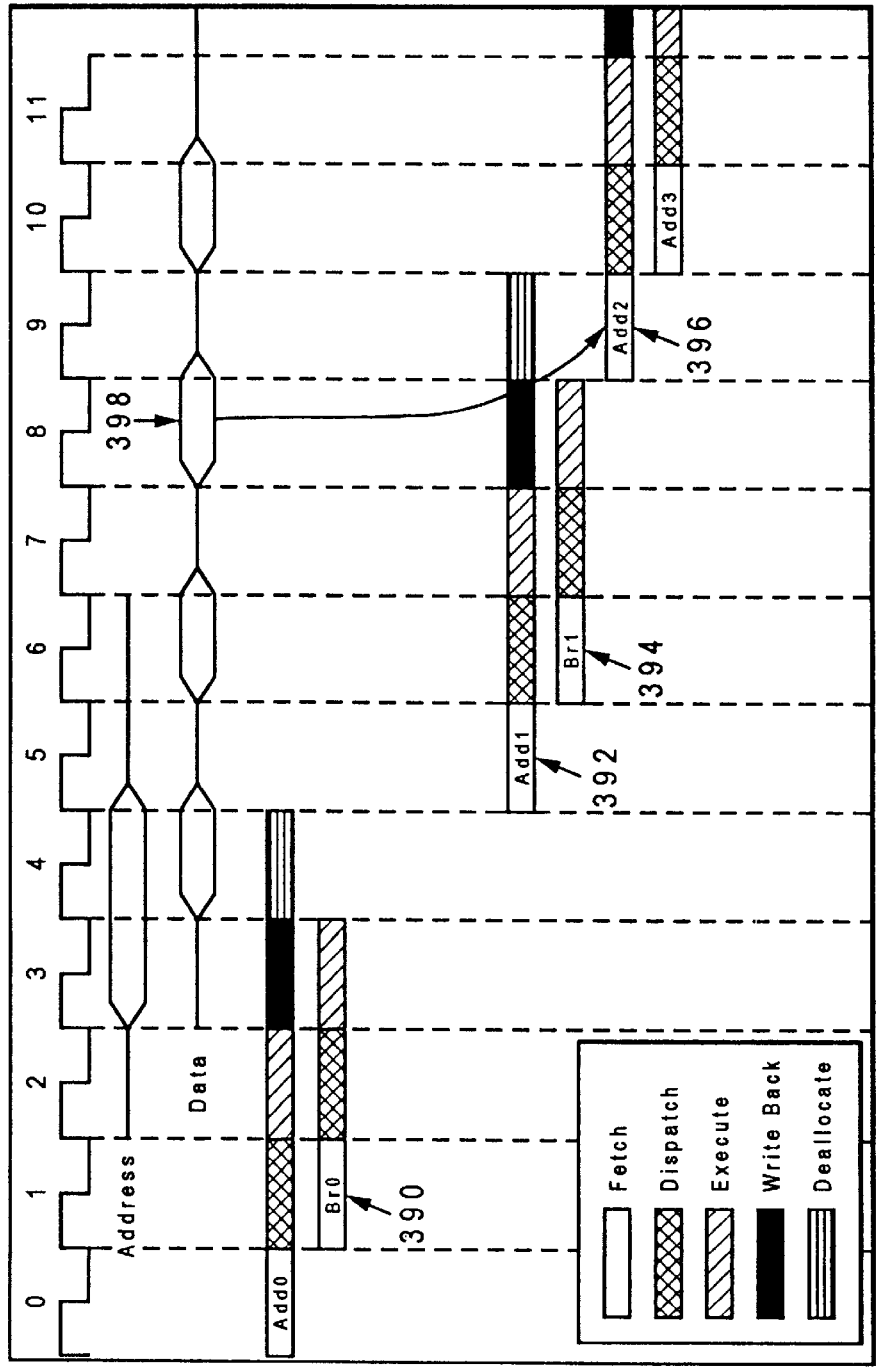
FIG. 6 is a timing diagram which illustrates a cache miss followed by the execution of a branch instruction which is loaded in a block of instructions that is loaded as a result of the cache miss in accordance with the method and system of the present invention.

With reference now to FIG. 6, there is depicted a timing diagram that illustrates cache miss followed by the execution of a branch instruction which is loaded in the block of instructions that is loaded as a result of the cache miss. As illustrated, branch instruction 390 causes a cache miss because the target of branch instruction 390—which is add instruction 392 is not currently stored in instruction cache 118. In response to such a cache miss, address information is placed on address bus 122 during cycle 3, and the first beat of instruction data returns from data bus 124 during cycle 4. Since the critical word—which is address instruction 392—is returned from the bus first, such critical word is forwarded to sequential fetcher 112 as it is being loaded into instruction cache 118 in cycle 5. The next instruction, branch instruction 394, is the second instruction of the first beat to be received from data bus 124. In the example shown in FIG. 6, branch instruction 394 branches to a target address which is in the cache line currently being loaded. The target address of branch 394 contains add instruction 396, which is not loaded into instruction cache 118 until the third beat, as shown by the arrow from data 398 to address instruction 396. Therefore, FIG. 6 depicts the case where sequential fetcher 112 is held off until the four-bit invalid tag indicates that address instruction 396 has been loaded into instruction cache 118. By monitoring the four-bit invalid tag, sequential fetcher 112 is able to fetch add instruction 396 before the completion of the block load in cycle 11.

In summary, the present invention allows sequential fetcher 112 to fetch instructions from instruction cache 118 as those instructions become available during a block instruction load from bus interface unit 120, and when a branch instruction cause instruction flow to continue in another cache line. According to the present invention, instruction cache 118 has a more granular busy indicator, where the multi-bit invalid tag indicates instruction cache 118 is busy with respect to each beat or word being loaded into instruction cache rather than indicating that instruction cache 118 is busy during the entire block transfer from bus interface unit 120. The method and system of the present invention allows sequential fetcher 112 to continue fetching instructions if those instruction are already available in alternate cache lines, or as those instructions become available while instructions in a cache line are being loaded. In the prior art, sequential fetcher 112 was stalled if a branch instruction diverted program execution out of a cache line which was being forwarded to sequential fetcher 112 as bus interface unit 120 was loading instructions into instruction cache 118.

Those persons skilled in the art should also recognize that the present invention may be applied to data cache 126, so that load/store unit 104 will not be stalled if data is required while bus interface unit 120 loads a block of data into data cache 126, or will only be stalled until a particular beat is loaded into data cache 126. The problems described above in relation to instruction cache 118 may also occur when load/store unit 104 attempts to read data from data cache 126 while bus interface unit 120 is loading a block of data into data cache 126. By utilizing a group of invalid tag bits in load/store unit 104 controlled by bus interface unit 120, load/store unit 104 may be allowed to fetch data words from data cache 126 while data cache 126 is receiving a block of data words from bus interface unit 120.

While the method and system of the present invention have been described in a superscalar data processing system environment, those persons skilled in the art should recognize that the method and system of the present invention may be applied to a more conventional data processing system having a single execution unit for executing instructions. The method and system of the present invention may also be applied to data processing systems that store data and instructions in the same cache.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method in a processor for efficiently interfacing with cache memory, said method comprising the steps of:

loading a plurality of instructions from a lower level memory into at least a first cache line within said cache memory;

as each individual one of said plurality of instructions is loaded into said first cache line, indicating that said each individual one of said plurality of instructions is valid;

in response to accessing an instruction while said plurality of instructions are being loaded into said first cache line, said accessed instruction branching to a next instruction among said plurality of instructions, waiting for said indication that said next instruction is valid;

in response to said indication that said next instruction is valid, fetching said next instruction prior to all of said plurality of instructions being loaded into said cache memory; and in response to executing an instruction while said plurality of items of information are being loaded into said cache memory, said instruction indicating an item of information in a second cache line of said cache memory that is not being loaded, immediately fetching said indicated item of information from said cache memory prior to all of said plurality of items of information being loaded into said at least said first cache line of said cache memory.

2. The method for efficiently interfacing with cache memory according to claim 1, and further including the step of:

individually indicating that each of said plurality of instructions is invalid prior to loading any of said plurality of items of information into said cache memory.

3. The method for efficiently interfacing with cache memory according to claim 1, wherein said step of loading a plurality of instructions from said lower level memory into said cache memory includes the step of loading four beats from said lower level memory into said cache memory, where each of said beats contain two instructions.

4. The method of claim 1, wherein said executed instruction comprises a branch instruction, and wherein said step of immediately fetching said indicated item of information comprises the step of immediately fetching another instruction.

5. The method of claim 1, wherein said executed instruction comprises a non-branch instructions and wherein said step of immediately fetching said indicated item of information comprises the step of immediately fetching a data operand of said non-branch instruction.

6. The method of claim 1, wherein said accessed instruction is a branch instruction and is one of said plurality of instructions.

7. A processor having an efficient interface with cache memory, said processor comprising:

means for loading a plurality of instructions from a lower level memory into at least a first cache line within said cache memory;

means for indicating, as each Individual one of said plurality of instructions is loaded into said first cache line, that said each individual one of said plurality of instructions is valid;

means, responsive to an instruction being accessed while said plurality of instructions are being loaded into said first cache line, said accessed instruction branching to a next instruction among said plurality of instructions, for waiting for said indication that said next instruction is valid;

means, responsive to said indication that said next instruction is valid, for fetching said next instruction prior to all of said plurality of instructions being loaded into said cache memory; and means, responsive to execution of an instruction while said plurality of items of information are being loaded into said cache memory, said instruction indicating an item of information in a second cache line of said cache memory that is not being loaded, for immediately fetching said indicated item of information from said cache memory prior to all of said plurality of items of information being loaded into said at least said first cache line of said cache memory.

8. The processor of claim 7, and further including:

means for individually indicating that each of said plurality of instructions is invalid prior to loading any of said plurality of instructions into said cache memory.

9. The processor of claim 7, wherein said means for loading a plurality of instructions from said lower level memory into said cache memory includes means for loading four beats from said lower level memory into said cache memory, wherein each of said beats contains two instructions.

10. The processor of claim 7, wherein said executed instruction comprises a branch instruction and said indicated item of information comprises another instruction.

11. The processor of claim 7, wherein said executed instruction comprises a non-branch instruction and said indicated item of information comprises a data operand of said non-branch instruction.

12. The processor of claim 7, wherein said accessed instruction is a branch instruction and one of said plurality of instructions.

* * * * *